United States Patent [19]
Kai

[11] Patent Number: 5,592,251
[45] Date of Patent: Jan. 7, 1997

[54] METHOD AND APPARATUS FOR PREVENTING IMAGE DEFLECTION IN AN OPTICAL SYSTEM

[75] Inventor: Tadao Kai, Kawosaki, Japan

[73] Assignee: Nikon Corporation, Tokyo, Japan

[21] Appl. No.: 257,034

[22] Filed: Jun. 8, 1994

[30] Foreign Application Priority Data

Jun. 8, 1993 [JP] Japan ................................. 5-163918

[51] Int. Cl.$^6$ ................................................. G03B 17/00
[52] U.S. Cl. ............................ 396/55; 348/208; 396/213
[58] Field of Search ................................. 354/400, 410, 354/430, 456, 70, 202, 266, 268; 348/208

[56] References Cited

U.S. PATENT DOCUMENTS 4,901,096 2/1990 Lemelson ........................... 354/430 X
5,150,150 9/1992 Enomoto ................................. 354/456

FOREIGN PATENT DOCUMENTS 3-243929 10/1991 Japan .
4-95932 3/1992 Japan .

Primary Examiner—Howard B. Blankenship

[57] ABSTRACT

A camera having an image deflection prevention function and which shortens the time from depression of a release button to the commencement of an exposure action while sufficiently maintaining an image deflection correction stroke during the exposure. After a full-depression operation of the release button, a camera CPU determines a drive position and drive direction of a blurring correction optical system based on an output from a correction optical system position sensor. When the drive direction of the blurring correction optical system is toward the center of its drive range, an exposure action is commenced. When the drive direction is away from the center of the drive range, an exposure action is inhibited.

25 Claims, 16 Drawing Sheets

METHOD AND APPARATUS FOR PREVENTING IMAGE DEFLECTION IN AN OPTICAL SYSTEM

BACKGROUND OF THE INVENTION

1. Field of the Invention

The present invention relates to a camera for preventing image deflection, and, more particularly, to a camera for preventing a time lag between a release operation and release action when image deflection prevention is being performed.

2. Description of the Related Art

Cameras capable of preventing image deflection are known in the related art. For example, Japanese Laid-Open Patent Publication 4-95932 (JP-A-95932) discloses a camera having an image deflection correction device with a finite drive range. Exposure is inhibited by inhibiting release action when the drive position of the image deflection correction device is in a peripheral portion of the drive range because the correction drive stroke is usually insufficient. However, a problem arises in the above-described related art technology when the drive position of the image deflection correction device is in a peripheral portion of its drive range inhibiting release action, and a release action is performed after the image deflection correction device has been driven to the central portion of the drive range. Specifically, when the above-described situation occurs, there is a delay between the time the release is operated and cancellation of the release action inhibition.

SUMMARY OF THE INVENTION

Accordingly, it is an object of the present invention to provide a camera which prevents image deflection and which shortens a time between operation of a release and cancellation of release action inhibition when an image deflection correction device is driven to correct for image deflection, and in addition sufficiently maintains the correction drive stroke.

The above object is achieved by providing a camera for preventing image deflection which includes a blurring movement detection device to detect an amount of blurring movement of the camera, and a blurring correction device to impart a corrective movement to a portion or to the whole of a photographic optical system or to a photographic film. The corrective movement is imparted in a direction which prevents the image on the film surface from blurring. A correction position detection device detects the position of the blurring correction device. A blurring control unit calculates an amount of correction of the blurring correction device from the output of the blurting movement detection device, to drive the blurring correction device according to the output of the correction position detection device. An exposure control unit commences an exposure when, after a release button has been depressed, the drive direction of the blurring correction device according to the output of the correction position detection device is toward the center of its drive range. The exposure control unit inhibits exposure when, according to the output of the correction position detection device, the drive direction of the blurring correction device is away from the center of its drive range. The exposure control unit may also commence an exposure a predetermined time after the release button has been depressed, when a set exposure time is shorter than a predetermined time.

The above object may also be achieved by providing a camera for preventing image deflection which includes plural blurring correction devices. When the camera includes plural blurring correction devices, the exposure control unit may commence an exposure when the drive direction of each of the plurality of blurring correction devices is toward the center of their respective drive ranges. Alternatively, when plural blurring correction devices are provided the exposure control unit may commence an exposure when a predetermined drive direction of a blurring correction device, for a high frequency blurring movement, is toward the center of its drive range. Still further, when plural blurring correction devices are provided the exposure control unit may operate to commence an exposure when a drive direction of a blurring correction device, for a high frequency blurring movement, is toward the center of its drive range. The camera for preventing image deflection according to the present invention may also include a mode setting device with at least an exposure mode and film windup mode. The exposure control unit commences exposure in accordance with the mode set by the mode setting device at a predetermined time after the release button has been depressed.

Therefore, in accordance with the present invention a release time lag, which is inconvenient for the photographer, is made smaller. Specifically, after the release button has been depressed to commence exposure, when the drive direction of the blurring correction device is toward the center of its drive range, after the blurring correction device has completed action of temporarily returning to the center of the drive range, the exposure action is quickly enabled by cancelling a release inhibition.

Further, when the drive direction of the blurring correction device is toward the center of its drive range, the probability of departing from the driveable range during the exposure is low, and good image deflection prevention during the exposure becomes possible.

Furthermore, it is also possible to eliminate the release time lag when the exposure time set in the camera is comparatively short because conditions are such that the exposure action is to be commenced immediately.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
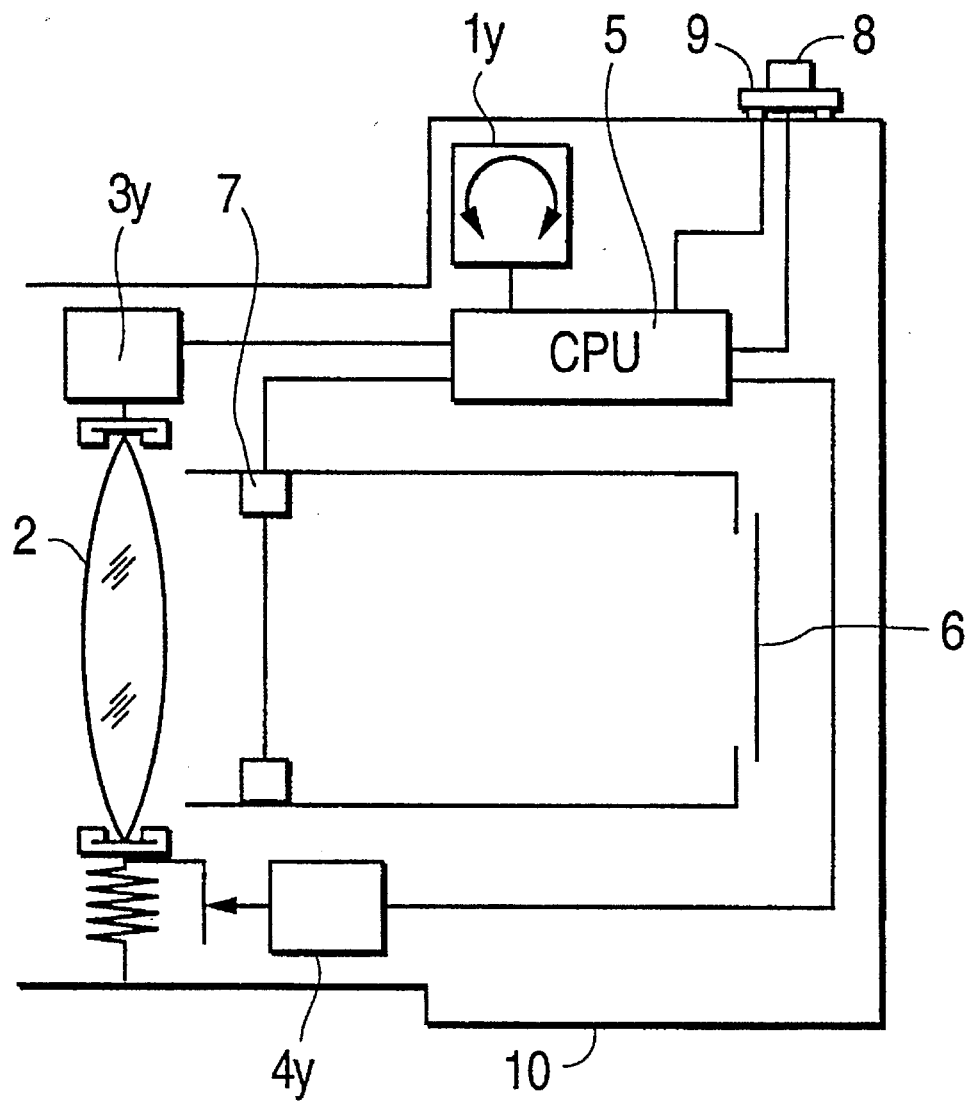
FIG. 1 is a side view of a camera having a blurring prevention function in accordance with a first embodiment of the present invention.

Reference will now be made in detail to the preferred embodiments of the present invention, examples of which are illustrated in the accompanying drawings wherein like reference numerals refer to the same or similar elements throughout.

Figure 2:
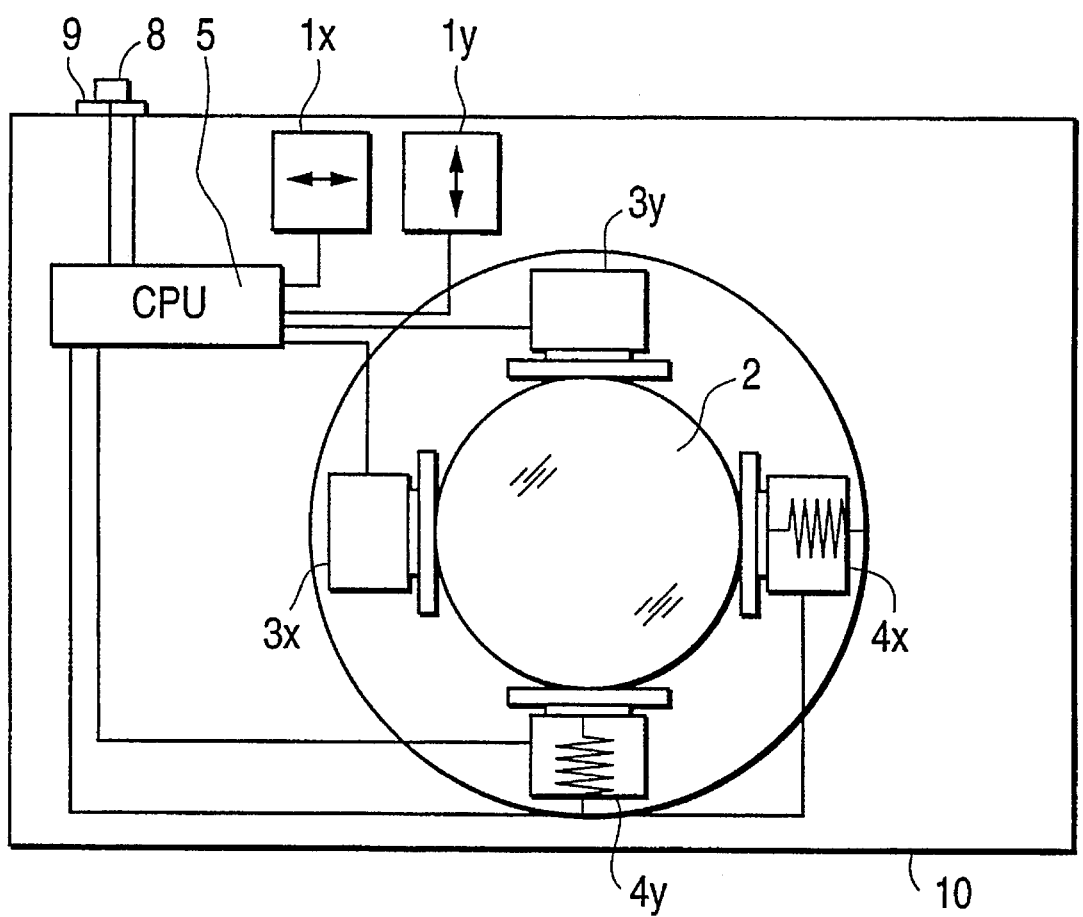
FIG. 2 is a front view of a camera having a blurring prevention function in accordance with the first embodiment of the present invention.

FIGS. 1 and 2 are a side view and front view, respectively, showing a camera 10 having an image deflection prevention function which may be used in accordance with a first embodiment of the present invention.

As seen in FIGS. 1 and 2, a pitch movement sensor 1y detects movement of the camera in the pitch direction relative to the optical axis of the camera. The pitch movement sensor 1y may be, for example, a vibratory type of angular velocity sensor having its output connected to a camera CPU 5, described in greater detail below. A yaw movement sensor 1x (FIG. 2) detects movement of the camera in the yaw direction and the output of the yaw movement sensor 1x is also connected to the camera CPU 5.

A blurring correction optical system 2 is provided which shifts an imaging lens to correct image blurring. A Y-direction correction drive unit 3y drives the blurring correction optical system 2 to shift in the vertical direction of the camera 10, and an X-direction correction drive unit 3x (FIG. 2) drives the blurring correction optical system 2 to shift in the transverse direction of the camera 10. The Y-direction correction drive unit 3y and the X-direction correction drive unit 3x are individually controlled by the camera CPU 5.

A correction optical system Y-position sensor 4y detects a shift position of the blurring correction optical system 2 in the vertical direction and its detection signal is output to the camera CPU 5. A correction optical system X-position sensor 4x (FIG. 2) detects a shift position of the blurring correction optical system 2 in the transverse direction and its detection signal is also output to the camera CPU 5.

The camera CPU 5 receives the outputs from movement sensors 1y and 1x and calculates an amount of blurring from the movement of the camera 10 detected by the movement sensors 1y and 1x. Based on the calculated amount of blurring, the camera CPU 5 calculates corresponding amounts of shift of the blurring correction optical system 2 in the vertical direction and transverse direction. While monitoring the outputs of the correction optical system position sensors 4y and 4x, the camera CPU 5 controls the correction drive units 3y and 3x to cause shifting of the blurring correction optical system 2 by an appropriate amount to prevent blurring of an image formed on film 6.

The camera CPU 5 is also connected to a lens shutter 7, a release button 8, a mode setting dial 9, and the like, and performs general sequence control of the camera, autofocus (AF) and autoexposure (AE) calculations. The lens shutter 7 also serves as a photographic stop, and the motion of the shutter 7 is controlled by signals from the CPU 5. The release button 8 includes two switch stages, particularly, a full-depression switch and a half-depression switch, each of which is connected to the camera CPU 5. When the half-depression switch is set ON, supply of electrical power to the camera components and like standard photographic actions are commenced. When the full-depression switch is set ON, actions for performing an exposure are commenced.

The mode setting dial 9 allows a photographer to set various action modes for the camera. These modes include a manual shutter time mode setting; a program mode setting; an exposure mode in which shutter timing is uniformly set to control exposure according to subject luminosity and photographic stop; automatic winding modes, such as a single exposure mode to perform exposure of one frame activated only by means of the full depression action of the release button 8, or a continuous exposure mode to continuously perform exposure of multiple frames between depressions of the release button 8. The signals indicating various mode settings output by the mode setting dial 9 are input to the camera CPU 5.

Figure 3:
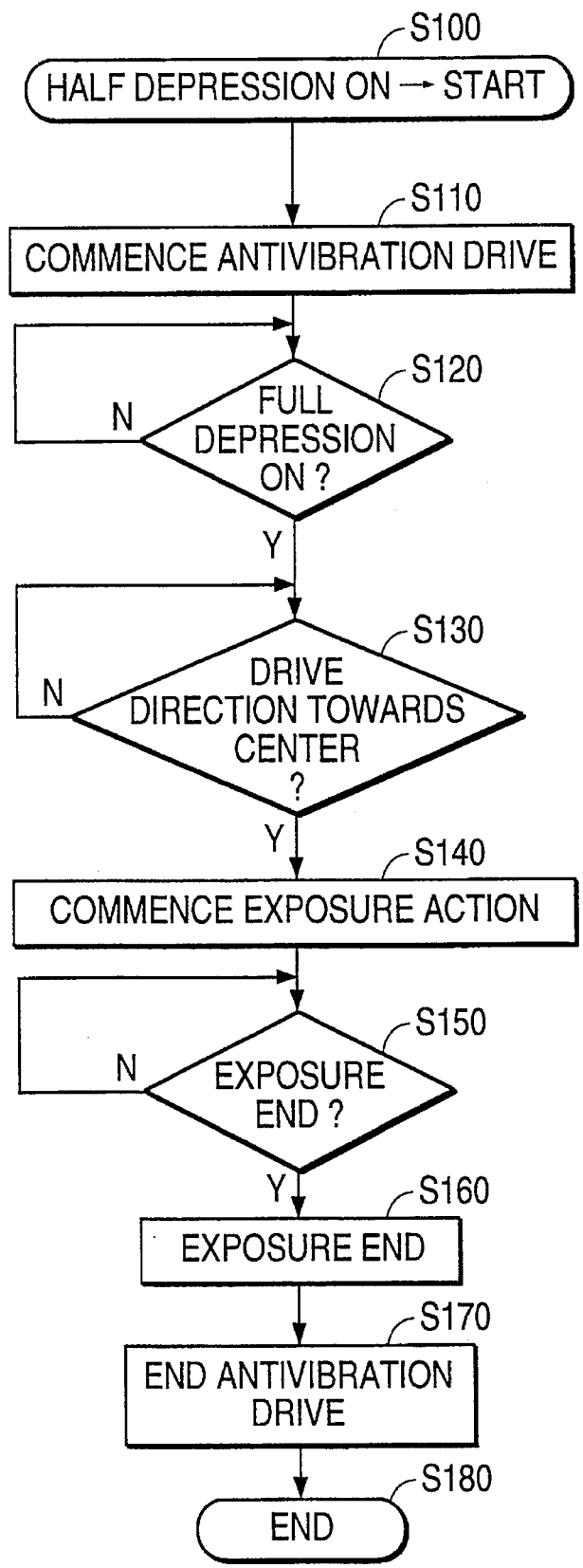
FIG. 3 is a flow chart showing an example of a control process for preventing release time lag in a camera having a blurring prevention function in accordance with the first embodiment of the present invention.

FIG. 3 is a flow chart showing an example of a control process for preventing a time lag between operation of a release and cancellation of release action inhibition in a camera having image deflection prevention in accordance with a first embodiment of the present invention.

The control process begins in step (abbreviated below as "S") 100, when the half-depression switch of the release button 8 is set ON, thereby supplying power to camera. In S110, appropriate anti-vibration drive amounts are calculated based on the signal outputs from blurring movement sensors 1y and 1x, and from the correction optical system position sensors 4y and 4x and the like. Drive control signals representing the calculated anti-vibration drive amounts are output to the correction drive units 3y and 3x, and anti-vibration shifting of the blurring correction optical system 2 is commenced.

Next, in S120, it is determined whether or not the full-depression switch of the release button 8 is ON. If the full-depression switch is not ON, the control process stops at S120; however, if the full-depression switch is ON, the control process proceeds to S130. In S130, it is determined whether or not the correction drive units 3y and 3x are being driven toward the center of the drive ranges of the respective drive units based upon the change of the outputs of the correction optical system position sensors 4y and 4x.

Figure 4:
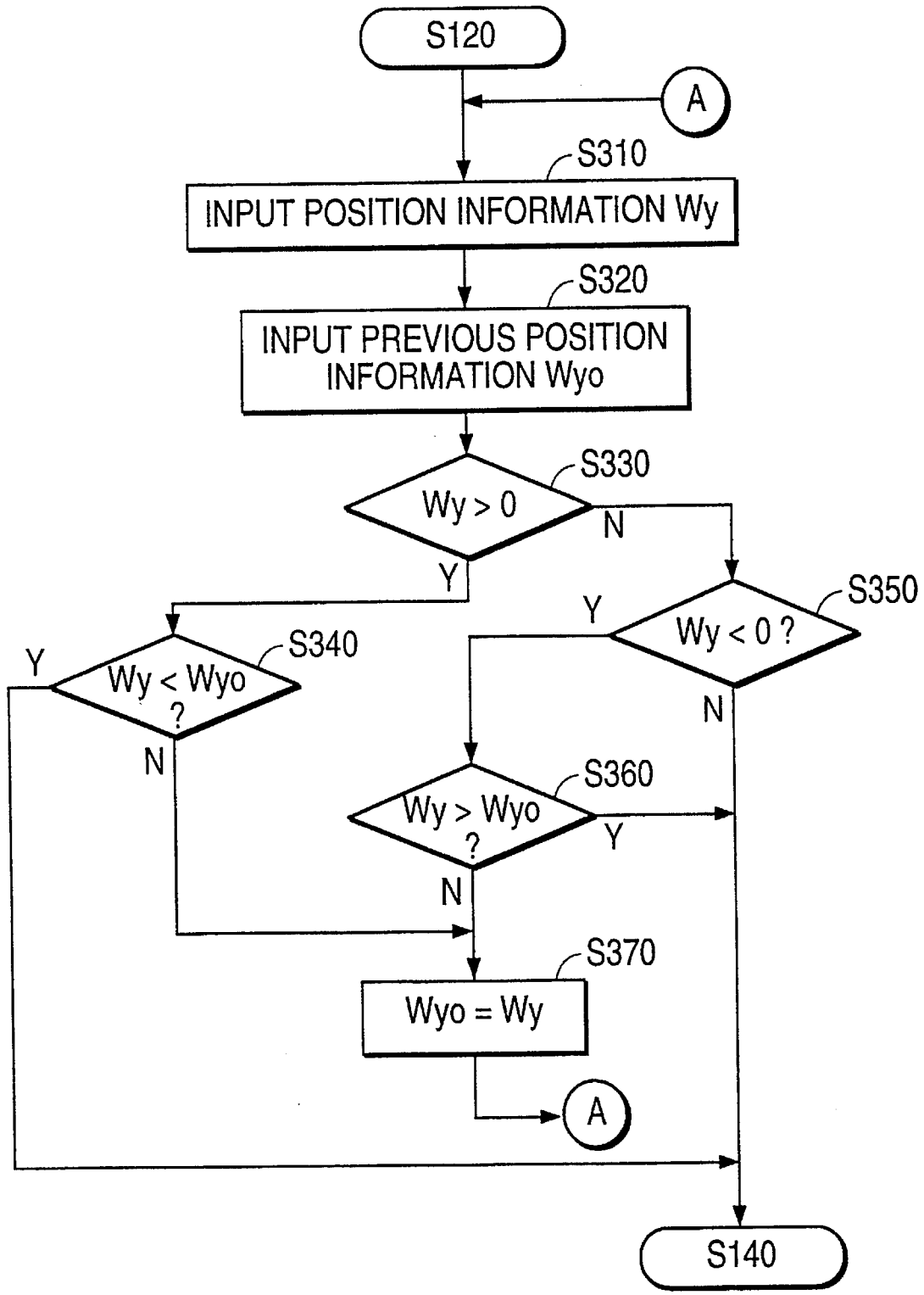
FIG. 4 is a flow chart showing an example of a process for drive direction determination in a camera having a blurring prevention function in accordance with the first embodiment of the present invention.

FIG. 4 is a flow chart showing the drive direction decision performed in S130 for each correction drive unit 3y and 3x. However, for the sake of simplicity, only the decision sequence for the Y-direction correction drive unite 3y will be described. The decision sequence for the X-direction correction drive unit 3x is the same except, of course, in the X-direction decision sequence the position information used corresponds to the position of the drive unit 3x for the X-direction.

First, in S310 the output signal of the correction optical system position sensor 4y is input to the camera CPU 5. The output signal from the correction optical system position sensor 4y represents position information denoted by Wy. Next, in S320, the output signal information of the correction optical system position sensor 4y from the previous position information detection time is input to CPU 5. The position information from the previous detection time is denoted by Wyo. The output signal information for the correction optical system position sensor 4y from the previous detection time is obtained by storing in a memory portion of the CPU 5, the output signal information of the correction optical system position sensor 4y detected in S110 and S120.

Continuing in S330, it is first determined whether or not Wy>0. Here "0" is the center point of the range of motion of the blurring correction optical system 2 driven by the Y-direction correction drive unit 3y. For reference purposes, when Wy is positive (+), the blurring correction optical system 2 is considered upward from the center point of the range of motion of the blurring correction optical system 2; when Wy is negative (−), the blurring correction optical system 2 is considered downward from the center point of the range of motion. In S330, if the condition Wy>0 is satisfied, the control process proceeds to S340; however, if the condition Wy>0 is not satisfied, the process proceeds to S350.

If the condition Wy>0 is satisfied in S330, in S340 it is determined whether or not Wy<Wyo. When Wy is (+) and Wy<Wyo holds, the blurring correction optical system 2 is being driven from a point upward from the center point of the range of motion of the blurring correction optical system 2 in the direction toward the center point. In this case, the margin of motion of the blurring correction optical system 2 is at least half of the full range of motion of the blurring correction optical system 2 in the direction that the blurring correction optical system 2 is expected to be driven. If exposure is commenced in this state, the anti-vibration correction drive stroke during the exposure may become large. Therefore, in S340, if the condition Wy<Wyo is satisfied, S130 ends and the control process then proceeds to S140 where exposure action is commenced.

If the condition Wy<Wyo is not satisfied in S340, the blurring correction optical system 2 is already upward from the center point, and it is being driven further in a direction upward from the center point. In this case, the margin of motion of the blurring correction optical system 2 is less than half of the range of motion in the direction the optical system 2 is being driven. Therefore, the exposure action is postponed, S130 continues, and control proceeds to S370. In S370, the previous position information Wyo is changed to the present position information Wy by setting Wyo=Wy, and the control process returns to S310.

If in S330 the condition Wy>0 is not satisfied, the control process proceeds to S350 where it is determined whether or not Wy<0. Here, if Wy<0 does not hold, then Wy=0, and when Wy=0 it generally does not matter that the exposure is performed. Therefore, S130 ends and control proceeds to S140 where exposure action is commenced. It is noted that it is very rare that Wy=0, and therefore the probability that Wy=0 is very low. Of course, postponing the exposure action because it is safe from the viewpoint of image blurring prevention is also satisfactory.

In S350, when the condition Wy<0 is satisfied, the control process proceeds to S360. In S360 it is determined whether or not Wy>Wyo. Because Wy is (−) in S360, when the condition Wy>Wyo is satisfied, the blurring correction optical system 2 is being driven from a point downward from the center point of the range of motion of the blurring correction optical system toward the center point. In this case, the margin of motion of the blurring correction optical system 2 is at least half of the range of motion in the direction in which the optical system 2 is being driven. Therefore, if an exposure is commenced in this state, a large anti-vibration stroke is obtained during the exposure.

In S360, when the condition Wy>Wyo is not satisfied, the blurring correction optical system 2 is already downward from the center point of the range of motion of the blurring correction optical system 2, and is being driven further in the downward direction. In this case, there is a margin of motion which is less than half of the range of motion in the direction in which the optical system 2 is being driven. Therefore, the exposure action is postponed, S130 continues, and in S370 the previous position information is updated by setting Wyo=Wy, and the control process returns to S310.

Therefore, the decision to proceed to S140 described above is made in S130 when the conditions are such that image blurring will not occur or is minimized. It is also noted that when the process in FIG. 4 is initially performed, the initial value of Wyo is the same as Wy. Further, the drive direction decision has been described above for the Y-direction drive unit, but the conditions for proceeding to S140 hold for both the Y-direction and the X-direction.

Returning now to the description of the flow chart of FIG. 3. When the determination in S130 is affirmative, in S140 control of the operating action of shutter 7 is performed, and a sequence of exposure actions is commenced. Here, an exposure action means the commencement of exposure of the film 6. Not directly related to the commencement of exposure of the film, for example, a lens focusing action, or a mirror raising action in a single lens reflex camera may, of course, also take place in S140.

Proceeding to S150, it is determined whether conditions for the end of exposure are satisfied. For example, it is determined whether the shutter time has elapsed and like conditions for the end of exposure are satisfied. If the conditions for end of exposure are satisfied, control proceeds to S160 and the exposure action ends by light screening action control of the shutter 7. Next, in S170 the anti-vibration drive ends, and, proceeding to S180, the sequence of photographic actions ends.

As described above, in accordance with the first embodiment of the present invention after the release button has been depressed, exposure is commenced when the drive direction of the blurring correction optical system 2 is toward the center of its range of motion. Since exposure is commenced when the drive direction of the blurring correction optical system 2 is toward the center of its range of motion, there will be a margin of movement of at least a half of the range of motion of the blurring correction optical system 2 in the direction in which the optical system 2 is being driven, and the anti-vibration stroke during the exposure can be expected to be large.

Figure 5:
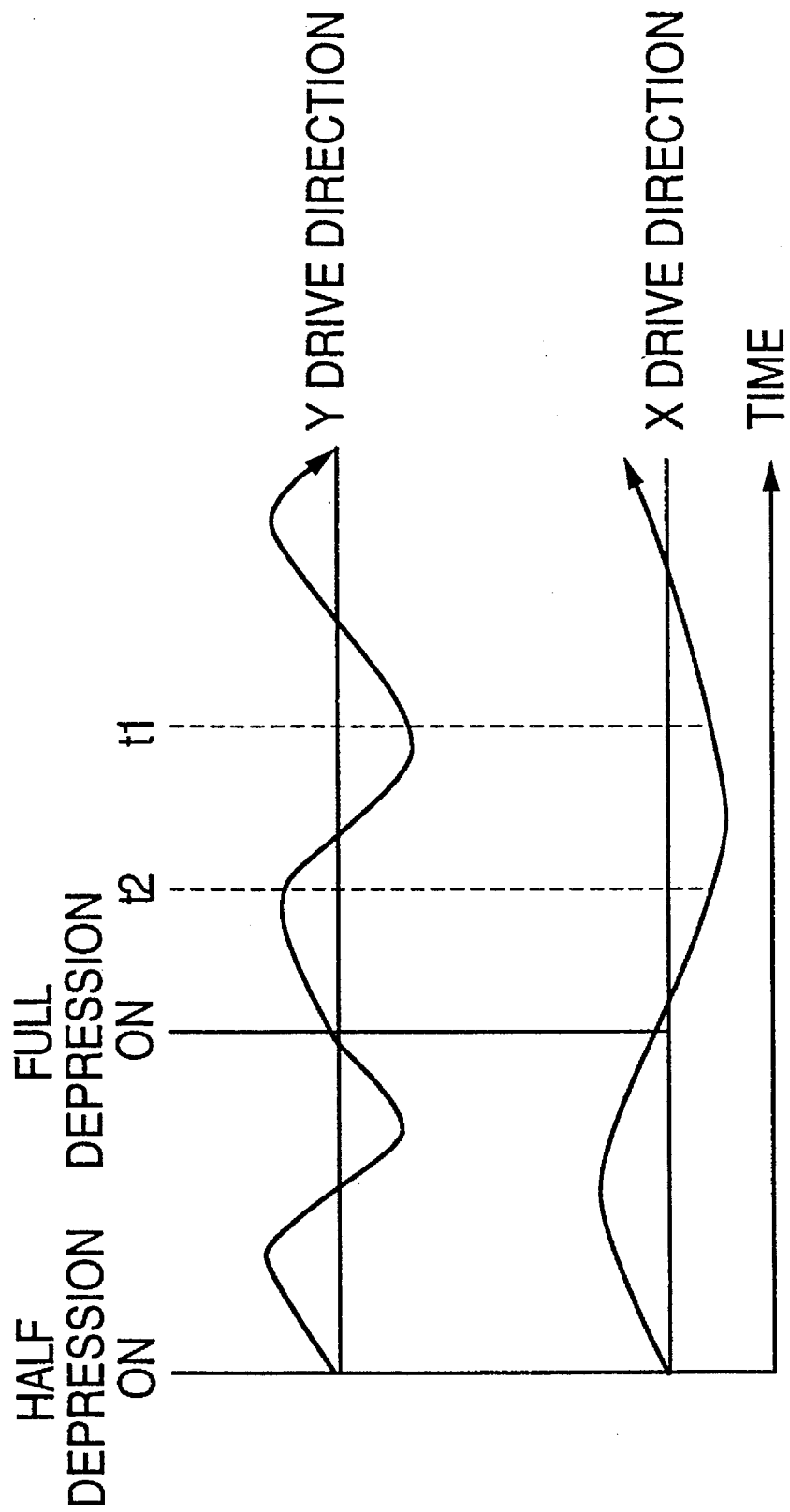
FIG. 5 is a graph showing a relationship between the release button action and the exposure commencement timing in a camera in accordance with the first embodiment of the present invention.

FIG. 5 is a graph showing the relationship between the Y-direction and X-direction position change of the blurring correction optical system 2 and the timing of release button action and exposure commencement in accordance with the first embodiment of the present invention.

According to the first embodiment, control proceeds from S130 to S140 only when the conditions for proceeding hold for both the Y-direction and the X-direction. As shown in FIG. 5, from the point in time when the full-depression switch of the release button 8 is ON, exposure commences after a time t1 when the Y-direction correction drive unit 3y and the X-direction correction drive unit 3x are toward the center of the range of motion.

Furthermore, when blurring motion of the camera occurs in a vertical direction caused by, for example, hand shake, the component of vibration in the vertical direction is large, even though the exposure is delayed until the conditions described above are satisfied. However, this situation does not become a problem in practical application.

Moreover, in accordance with the first embodiment of the present invention, the above-described kind of exposure permissible/not permissible decision may be performed by an attitude sensor capable of determining whether the attitude of the camera is transverse or vertical in relation to the direction of gravity.

It will be recognized that the first embodiment of the present invention is not limited to the features described above. For example, with respect to the blurring movement of the camera which typically results when the camera is held in the hands, the vibrations in the up and down direction (Y-direction) are large, and the vibrations in the transverse direction (X-direction) are comparatively small. Consequently, since vibrations in the Y-direction are larger, the first embodiment of the present invention may be modified such that if the above-described conditions for proceeding from S130 to S140 hold for the Y-direction, the exposure can be commenced regardless of the state in the X-direction. In FIG. 5, this corresponds to the case in which the exposure commences after the time t2.

Further, an application function may also be added to the mode setting dial 9 such that the shutter speed may be changed, the limits of the shutter speed are fractions of the focal length of the photographic lens ranging from the inverse of the focal length to sixteen times the inverse of the focal length.

Furthermore, when the shutter time set by the photographer corresponds to high shutter speed, or when the shutter time determined by subject luminosity is a time corresponding to a high shutter speed, the exposure may be commenced at the the time the full-depression switch of the release button 8 is set ON without dependence on the drive condition of the blurring correction optical system 2. The upper boundary of shutter time may be four times the inverse of the focal length of the photographic lens.

Still further, the exposure action may commence when the full-depression switch of the release button 8 has been set ON, without dependence on the drive condition of the blurring correction optical system 2, when the automatic windup mode is set in the continuous mode to increase the frame transmission speed.

Still further, an application function may be added to the mode setting dial 9 which sets the shutter speed when some degree of blurring movement is expected based on the level of the photographer's skill or the photographic conditions. Exposure may be commenced without dependence on the drive condition of the blurring correction optical system 2.

The limits of the shutter speed may be, for example, from the inverse of the focal length of the photographic lens to ¼ the inverse of the focal length of the photographic lens, and the shutter speed may change according to the setting of each photographic mode.

Moreover, as the drive direction of the blurring correction optical system 2 becomes more distant from the center of the drive range the exposure may be inhibited.

Figure 6:
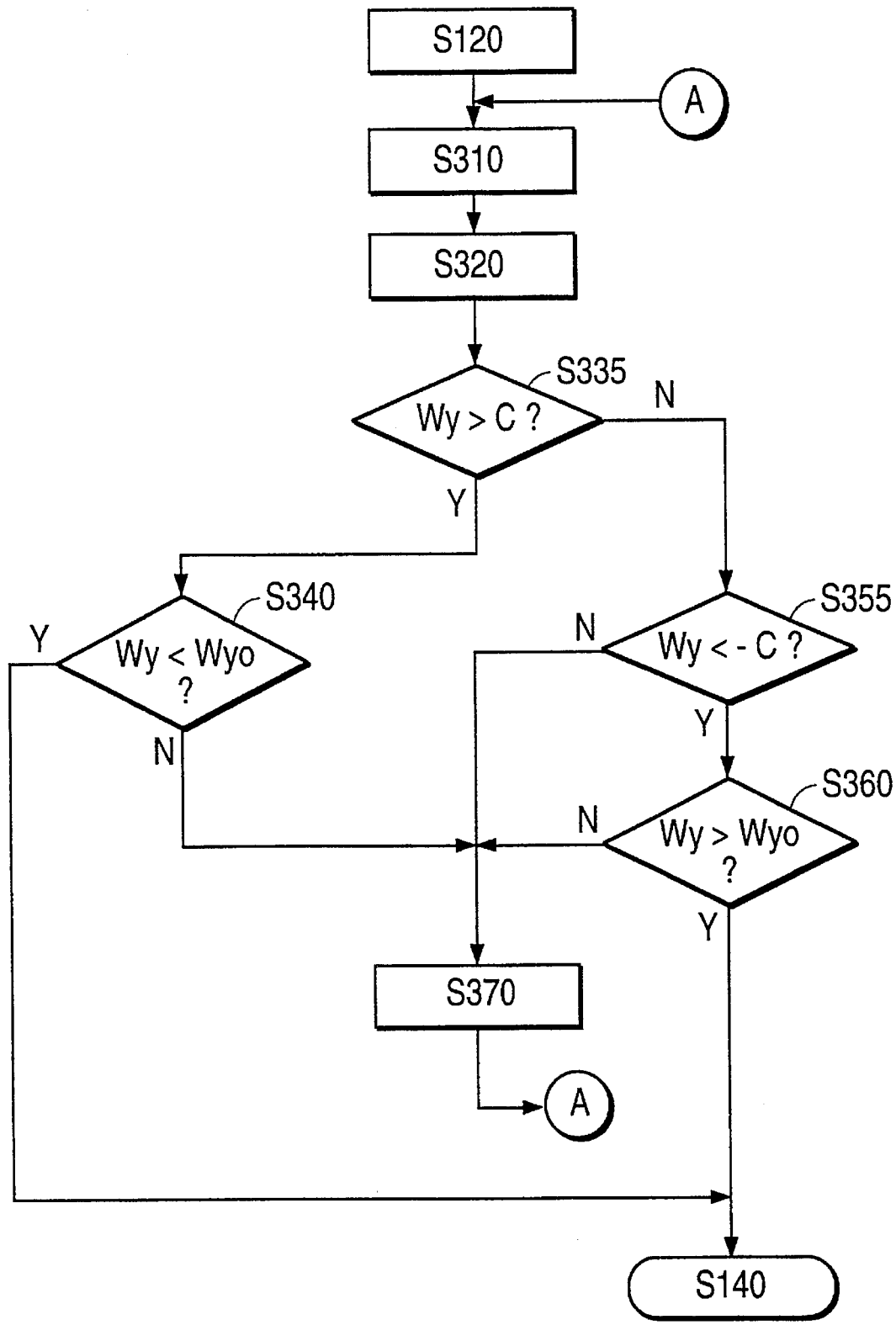
FIG. 6 is a flow chart showing an example of a process for drive direction determination in a camera having a blurring prevention function in accordance with a second embodiment of the present invention

FIG. 6 is a flow chart illustrating control sequence for drive direction determination in a camera having an anti-vibration function in accordance with a second embodiment of the present invention. The steps described with reference to FIG. 6 correspond to actions which are performed in S130 in FIG. 4. The portions of the description of FIG. 6 which are the same as the description of FIG. 4 are abbreviated or omitted from the description. Further, for the sake of simplicity, only the decision sequence for the Y-direction is described.

As seen in FIG. 6, in accordance with the second embodiment of the present invention, first steps S310 and S320 are performed as described with respect to FIG. 4. Next, in S335, it is determined whether Wy>C, where C is a predetermined positive (+) value. Information related to the predetermined value C may, for example, be stored previously in the memory portion of the camera CPU 5, or other suitable memory. Furthermore, as will be described in greater detail later, it does not matter if the information related to C is information which changes according to the photographic conditions. When the condition Wy>C is satisfied, it is determined that the blurring correction optical system 2 is further above the center point of the range of motion than the value C.

Therefore, when the condition Wy>C is satisfied, the control process proceeds from S335 to S340. In S340 it is determined whether the condition Wy<Wyo is satisfied. If Wy<Wyo is satisfied, the blurring correction optical system is being driven from a point upward from the center point of the range of motion toward the center point, and the margin is at least half of the range of motion +C in the direction in which the optical system 2 is being driven.

However, when the condition Wy>C is not satisfied, control proceeds to S335 where it is determined whether Wy<−C. When the condition in S355 is satisfied, control proceeds to S360 where it is determined whether Wy>Wyo. If the condition Wy>Wyo is satisfied, the blurring correction optical system 2 is moved from a point below the center point toward the center point, and the margin is at least half of the range of motion+C in the direction in which the optical system 2 is being driven.

Furthermore, in S355, if the condition Wy<−C is not satisfied, control proceeds to S370, regardless of the direction of motion, because −C<Wy<+C. In this case, a margin is anticipated of, at a minimum, half of the range of motion −C in the direction in which the blurring correction optical system 2 is being driven. Thus, even if C is large, the driving margin is not considered to be half, and the exposure action is postponed, S130 is not ended, and in S370 the previous position Wyo is set such that Wyo=Wy.

A value of ¼ or less is normally appropriate for the value of C, when the range of motion of the blurring correction optical system 2 is set as ±1. A value of ¼ or less is normally appropriate for C because when the value of C is too large, there is a possibility that the release timing may become long. Moreover, when the value of C is rather small (for example, ⅛ or less when the range of motion is set equal to ±1), in S355 even when the condition Wy<−C is not satisfied, S130 terminates irrespective of proceeding to S140.

The value of C described with respect to FIG. 6 may be a shutter speed set by the photographer or, may be automatically changed according to the shutter speed decided pursuant to the subject. For example, when the shutter speed setting at the time of photography is four times the inverse of the focal length of the photographic lens, the value of C may be about ¼–⅛. When the shutter speed setting is a higher speed, the value of C is small; when the shutter speed setting is a lower speed, the value of C may be set larger.

When the shutter speed changes, the value of C may change in proportion to the change in shutter speed, or may change in proportion to the square root of the rate of change of the shutter speed, or may be a special relationship found from previous experimental values. The setting of C may also change in accordance with the setting of each photographic mode.

Figure 10:
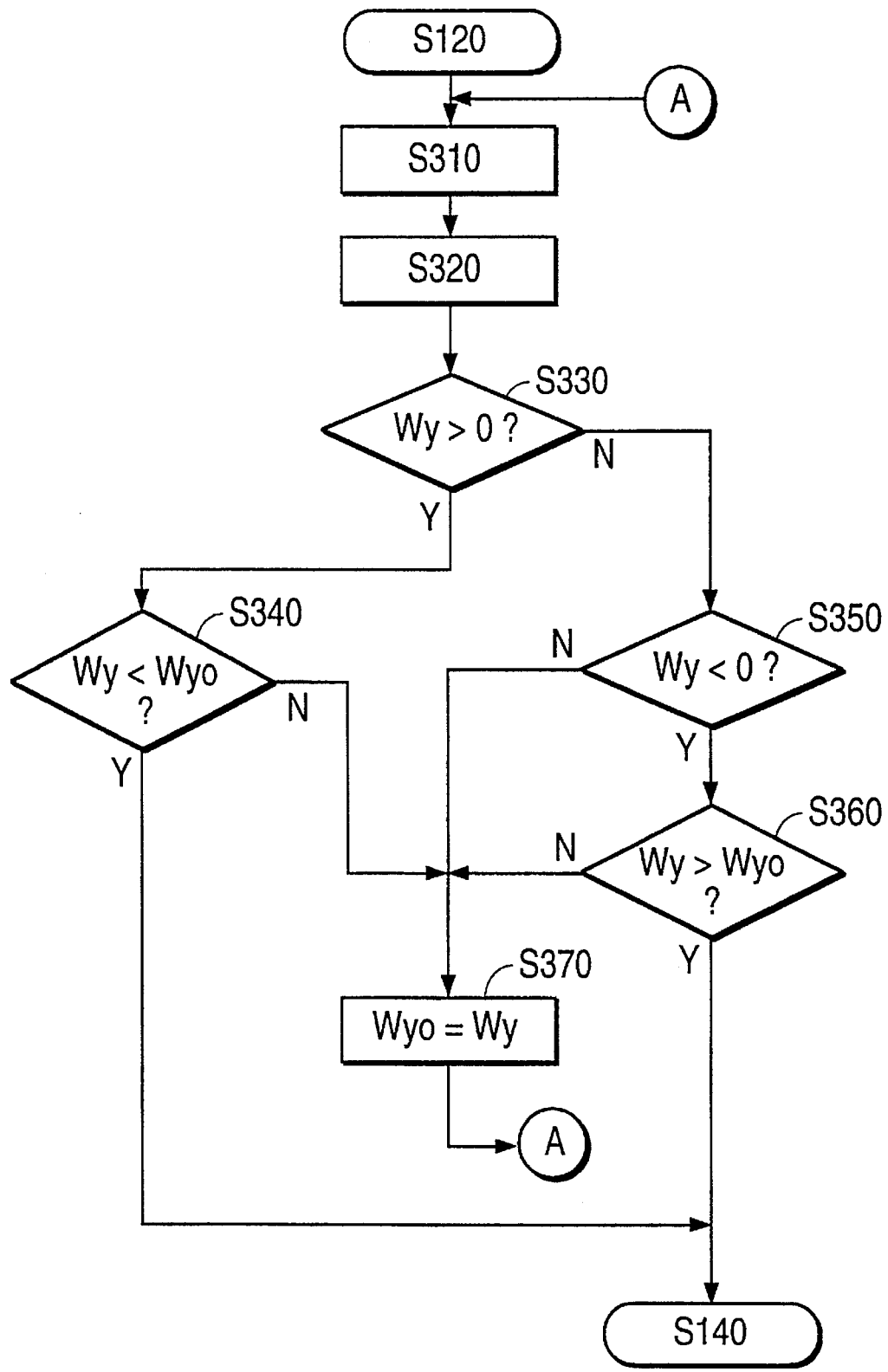
FIG. 10 is a flow chart showing an example of a process for drive direction determination when exposure is not permissible.

Moreover, in S130 of the first embodiment (FIG. 4), when $Wy=0$, the control process proceeds to S140. However, as seen in FIG. 10, when $Wy=0$, (i.e., $Wy<0$ in S350) exposure action may be postponed by returning to "A" from S370. FIG. 10 is a flow chart illustrating this modification of S130. Because the description of each of the other steps in FIG. 10 is similar to FIG. 4, a description of these steps is omitted.

Figure 11:
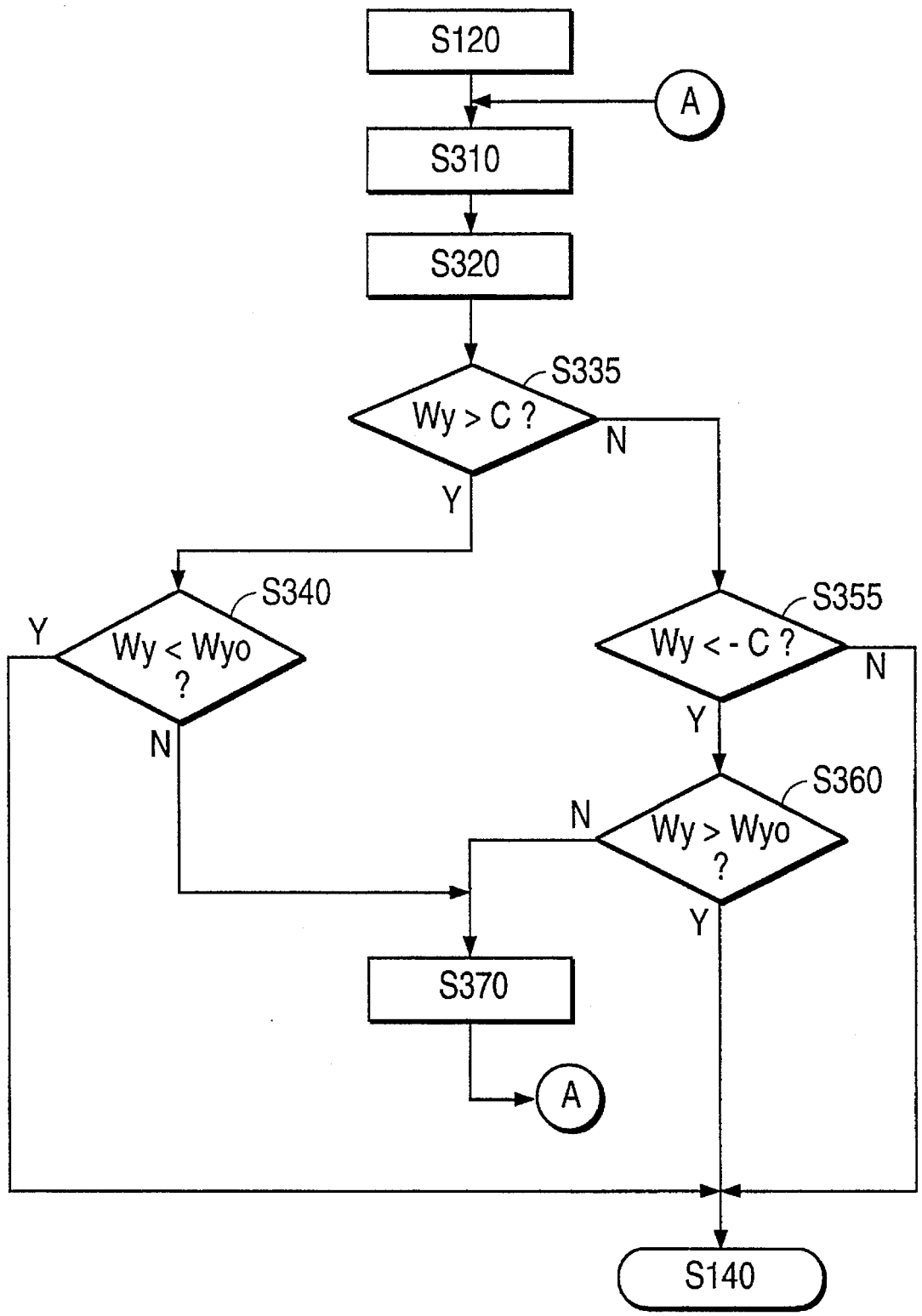
FIG. 11 is a flow chart showing an example of a process for drive direction determination when exposure is permissible.

FIG. 11 is a flow chart showing an example of a control process carried out in S130 when $-C \leq Wy \leq C$. FIG. 11 is essentially the same as FIG. 6 and a description of each step which is the same as FIG. 6 is omitted. Since $-C \leq Wy \leq C$, control will always proceed to S140.

In the process shown in FIG. 11, the value of C is chosen to be about ¼–⅛ of the range of movement of the blurring correction optical system 2. When the shutter speed setting is a higher speed, the value of C may be set large; when the shutter speed setting is slower, the value of C may be set small.

Figure 12:
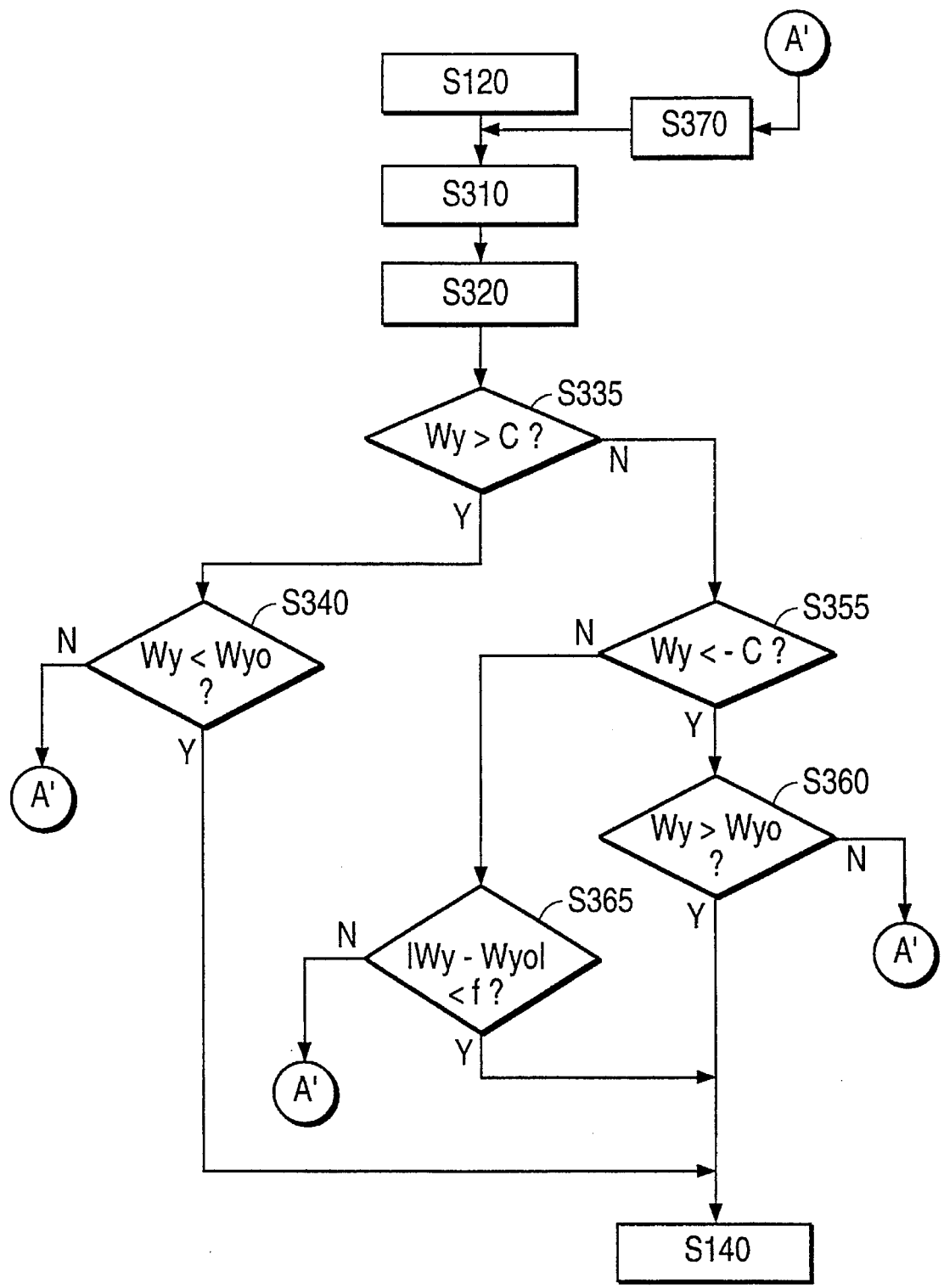
FIG. 12 is a flow chart showing an example of a process for drive direction determination when the drive speed is fast and exposure is not permissible.

FIG. 12 is a flow chart showing another example of a process for performing the drive direction determination in S130. Steps which are the same as those described with respect to FIG. 6 are referred to by the same reference numerals, and a description of these steps is omitted.

In accordance with the example shown in FIG. 12, Wy is subject to the condition $-C \leq Wy \leq C$, and the movement rate of the blurring correction optical system 2 is taken into account. In S335, when it is determined whether $Wy>C$, since $-C \leq Wy \leq C$, control proceeds to S365. In S365, it is determined whether $|Wy-Wyo|<f$, where "f" is a constant relating to a predetermined speed. Further, the absolute value of the difference between the present position information Wy and the previous time position information Wyo, represents the amount of movement of the blurring correction optical system 2 during a predetermined time during the process in S130, and therefore represents information relating to the speed of movement of the blurring correction optical system 2.

If the condition in S365 is satisfied, since $-C \leq Wy \leq C$, because the margin of the range of correction motion of the blurring correction optical system 2 is considered to be sufficient, control proceeds to S140 and an exposure is permitted. However, if to the contrary the condition $|Wy-Wyo|<f$ is not satisfied in S365, the margin of the range of correction motion is considered to be insufficient, and the control process returns to A' and exposure is not commenced.

The constant "f" may be modified automatically by coupling "f" to the shutter speed setting at the time of photography. When the range of motion of the blurring correction optical system 2 is set to ±1, the constant "f" is preferably set to a value 1–C, where C is related to the shutter speed as described above. The above-described "f" setting value, when the position of the blurring correction optical system 2 is Wy, is a value representing a condition not to exceed the range of motion of the blurring correction optical system 2, even if the shutter speed continues at the present speed of movement.

Of course, the value of "f" is not limited to the above-described values, and the value may be, for example, an empirically obtained coefficient (e.g., ×0.7–×1.4) of the above-described numerical value.

Figure 13A:
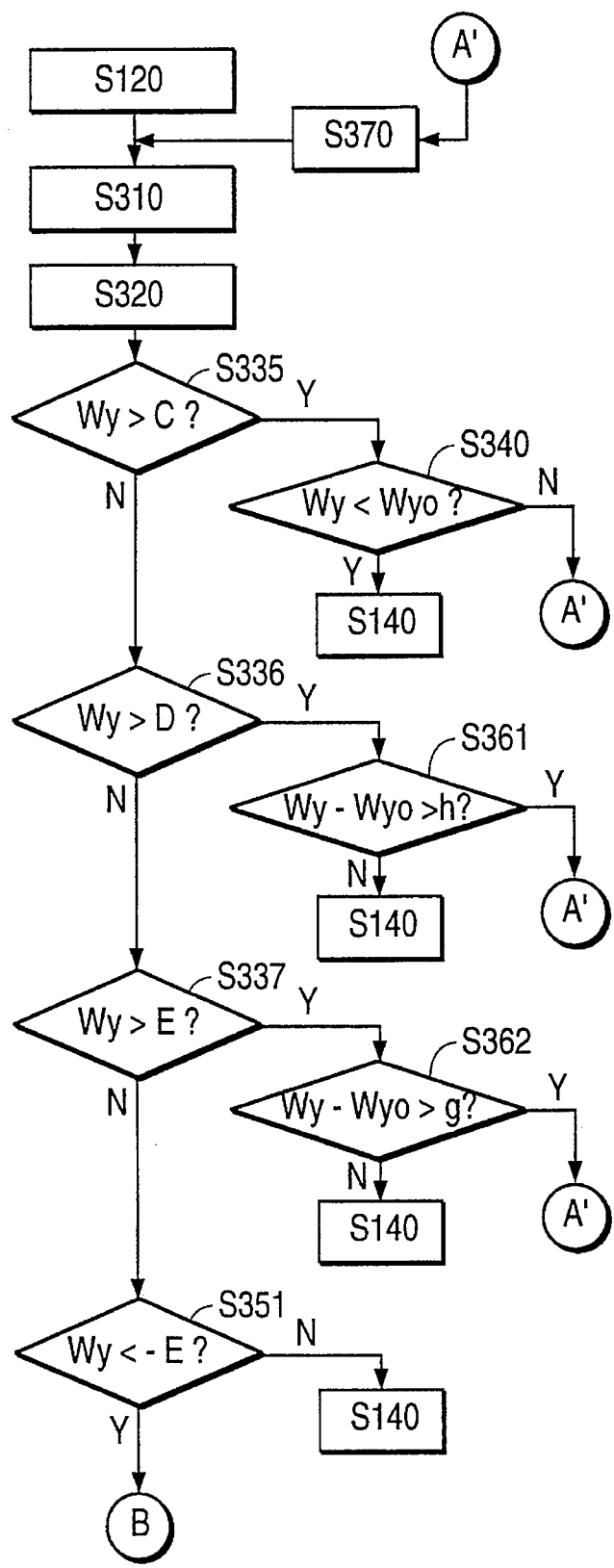
FIGS. 13A and 13B are flow charts showing an example of a process for drive direction determination by assessing drive direction and speed.
Figure 13B:
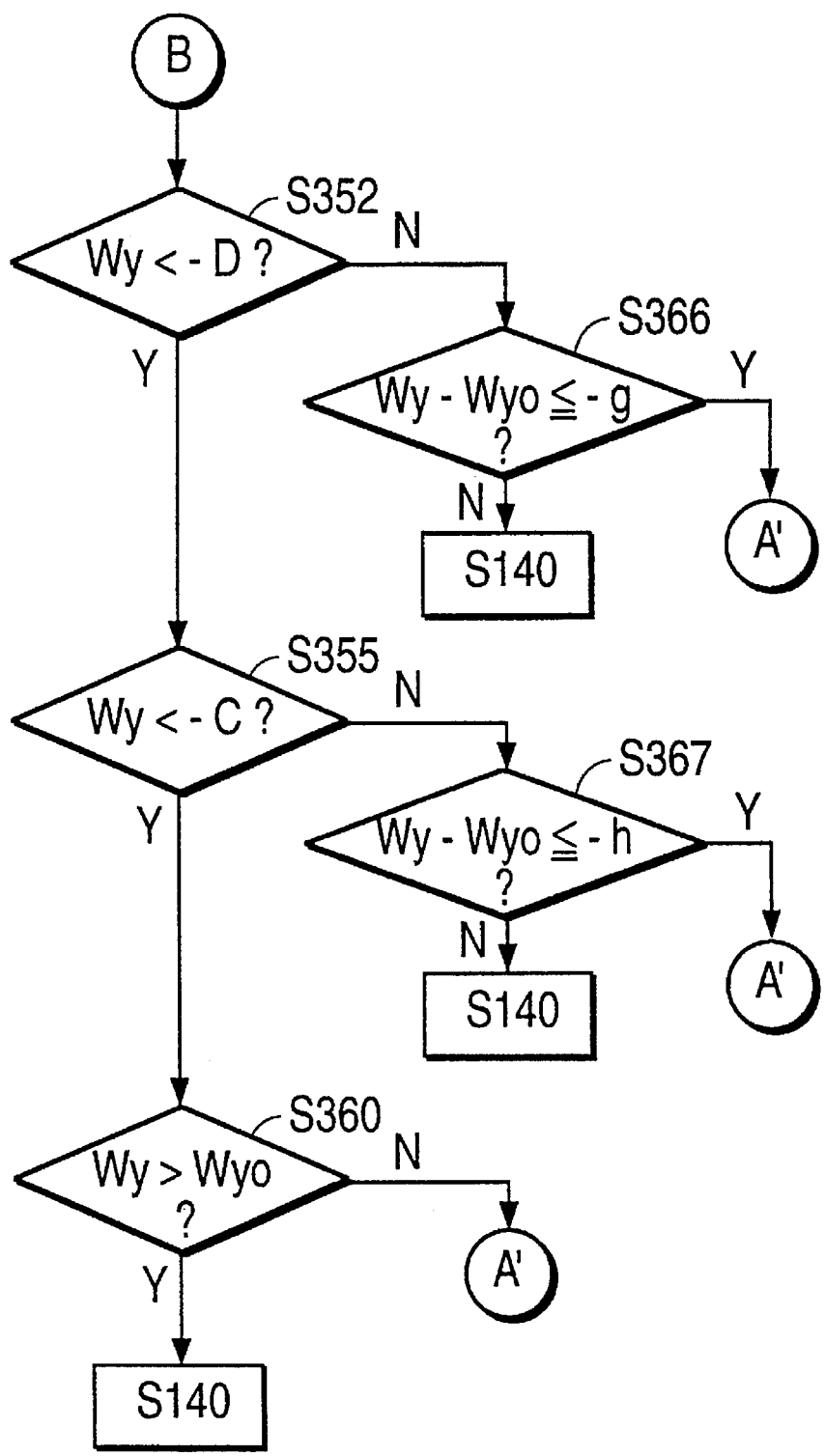

FIGS. 13A and 13B are flow charts showing an example of a control process performed in S130 in which the process of FIG. 12 is further developed.

As shown in FIGS. 13A and 13B, by minutely dividing the conditions used to test Wy, predetermined constants "C", "D", "E" are made the decision conditions. When the range of motion of the blurring correction optical system 2 is set as ±1, $1 \geq C \geq D \geq E \geq 0$. Moreover, the constants "h" and "g" ($0 \leq h \leq g$) relate to the speed of the blurring correction optical system 2, and are also used as determination conditions. Steps similar to those described with respect to FIG. 12 have been given the same reference numbers, and a description of these steps is omitted here.

In S336, it is determined whether or not $Wy>D$. If the condition $Wy>D$ is satisfied, $D<Wy \leq C$, and the control process proceeds to S361; if the condition in S336 is not satisfied, the control process proceeds to S337.

In S361, it is determined whether $Wy-Wyo>h$. If the condition $Wy-Wyo>h$ is satisfied, the speed of motion of the blurring correction optical system 2 in an outward direction from the center point is greater than a predetermined value, and exposure is not commenced. The control process returns to A'. If the condition $Wy-Wyo>h$ is not satisfied, commencement of an exposure action is permitted and control proceeds to S140.

With respect to "h", when the range of motion of the blurring correction optical system 2 has been set to ±1, it is preferable in S361 that the numerical value of "h" is set to correspond to a speed having a value of 1–C where C is related to shutter speed as described above. The reason is similar to that explained for FIG. 12.

In S336, when the condition $Wy>D$ is not satisfied, control proceeds to S337, and it is determined whether $Wy>E$. If the condition in S337 is satisfied, $E \leq Wy \leq D$, and the routine proceeds to S362; however, if the condition in S337 is not satisfied, control proceeds to S351.

In S362, it is determined whether $Wy-Wyo>g$. If the condition in S362 is satisfied, the speed of motion of the blurring correction optical system 2 in an outward direction from the center point is greater than a predetermined value, and exposure is not commenced. The control process returns to A'. If the condition $Wy-Wyo>g$ is not satisfied, commencement of an exposure action is permitted and control proceeds to S140.

With respect to "g", when the range of motion of the blurring correction optical system 2 has been set to ±1, it is preferable that in S362 the numerical value of "g" is set to correspond to a speed having a value of 1–D, where D is related to the shutter speed. (The reason is similar to S361).

In S351, it is determined whether or not $Wy<-E$. If the condition in S351 is not satisfied, $-E \leq Wy \leq E$, and because the blurring correction optical system 2 is close to the center of the range of motion, commencement of an exposure is permissible and control proceeds to S140. If the condition in S351, is not satisfied, control proceeds to S352. In S352 it is determined whether Wy<−D. If the condition Wy<−D is not satisfied, −D≦Wy≦−E, and control proceeds to S366; however, if the condition in S352 is satisfied, control proceeds to S355.

In S366, it is determined whether Wy−Wyo is ≦−g. If the condition in S362 is satisfied, the speed of motion of the blurring correction optical system 2 in an outward direction from the center point is greater than a predetermined value, and exposure is not commenced. The control process returns to A'. If the condition Wy−Wyo≦−g in S366 is not satisfied, commencement of an exposure action is permitted, and control proceeds to S140. The value of "−g" may also be set similar to that discussed for S362.

When the condition in S352 is satisfied, and −C≦Wy≦−D, control proceeds from S355 (description omitted) to S367. In S367, it is determined whether Wy−Wyo≦−h, and if the condition in S367 is satisfied, the speed of motion of the blurring correction optical system 2 in an outward direction is greater than a predetermined value, and exposure is not commenced. The control process returns to A'. However, if the condition Wy−Wyo≦−h is not satisfied, commencement of an exposure action is permitted and control proceeds to S140. The value of "−h" may be set in a manner similar to that described with respect to S361.

Therefore, in accordance with the control process shown in FIGS. 13A and 13B, based upon the conditions for Wy, and the conditions for the speed of movement in the outward direction of the blurring correction optical system 2, the commencement of an exposure is permitted under conditions such as not to depart from the range of motion of the blurring correction optical system 2.

Thus, from the point in time when the full-depression switch of the release button 8 is ON, even when the blurring correction optical system 2 is driven in the outward direction for a period of time, it is possible to shorten the time until an exposure action is commenced. Of course, when the drive direction of the blurring correction optical system 2 is in an inward direction, immediate commencement of an exposure is undertaken.

Further, with respect to the process shown in FIGS. 13A and 13B, as described with respect to FIGS. 11 and 12, the predetermined constants C, D, E and g and h may be modified to be automatically coupled to the shutter speed set by the photographer. Of course, there is no reason for the settings of the values of C, D, E and g, h, to be limited to the values in the description of FIGS. 13A and 13B. The values may apply an empirically obtained coefficient (e.g., ×0.7–×1.4) to the above-mentioned numerical value, or may be a special value found by previous experiment, or the values may change according to each photographic mode setting. Moreover, in FIGS. 13A and 13B, the determination standards for S335, S336, S337, S351, S352 and S355 were, respectively, values arranged symmetrically about "0" (zero), but there is no reason for the determination standards to be thus limited. Similarly, the values of the determination standards h, g, −g, −h of S361, S362, S366, S367 are not limited to those described above.

For example, the respective determination standards may be C, D, E, F, G, H. When the range of movement of the blurring correction optical system 2 is set to ±1, the determination standards may be set 1≧C≧D≧E≧F≧G≧H≧1. Further, the respective determination standards for speed may be h, g, f, e, and may be set such that h≧g≧f≧e.

The above determination standards are effective when, for example, a blurring movement is brought about by an inclined camera at the time of photography caused by the release button being pressed by the photographer.

Asymmetrical determination standards may be preferable. For example, due to the action of pressing the release button 8, a feeling of the camera oscillating downwards is expected. To correct image deflection, the blurring correction optical system 2 would be expected to be driven upwards. At such times, the determination standards may be set to |C|<|H|, |D|<|G|, to bias the determination standards for downward movement of the camera. Furthermore, the determination standards may be adjusted in relation to speed.

Although the above description has been in relation to motion for correction of Y-direction image deflection, the correction of X-direction image deflection is carried out in a similar manner. Moreover, the determination standards described above also relate to the X-direction determinations. It will also be recognized that further multiple steps of determination may be performed.

The determination standards C, D, E, g, h, −C, −D, −E, −g, −h may be previously stored in the memory portion of the camera CPU 5, or like storage. Further, it does not matter if the determination standards are calculated by the camera CPU 5 in accordance with the photographic conditions and the like, or are values calculated by applying coefficients to previously stored values.

Figure 14A:
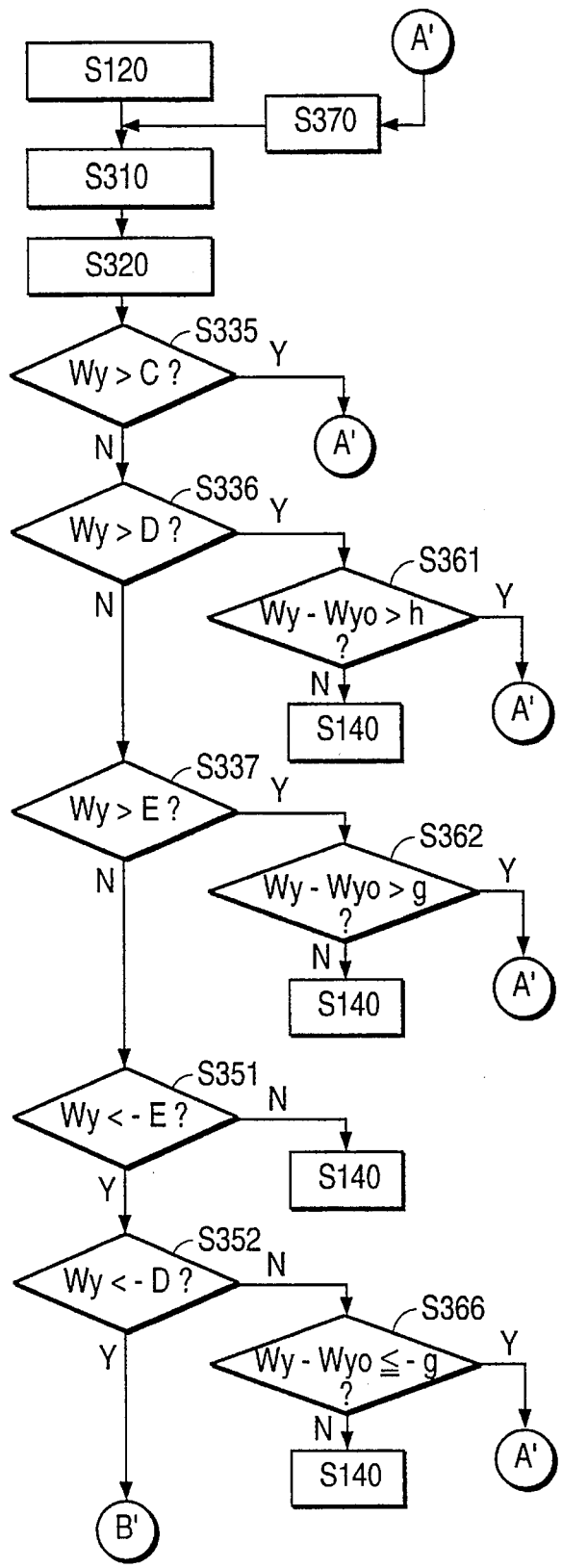
FIGS. 14A and 14B are flow charts showing an example of a process for drive direction determination which modifies the process shown in FIGS. 13A and 13B.
Figure 14B:
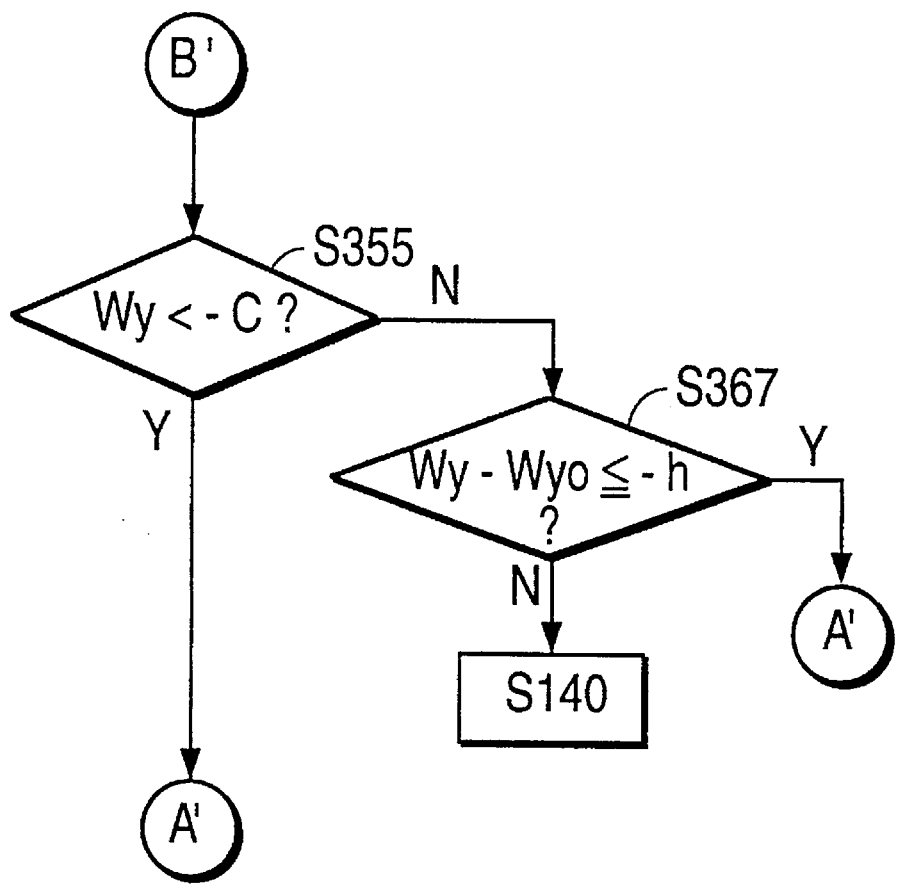

FIGS. 14A and 14B are flow charts showing another example of a drive direction determination process performed the S130 of the flow chart of FIG. 3. Because the content of each step in FIGS. 14A and 14B is similar to FIGS. 13A and 13B, a detailed description is omitted.

In the example described with respect to the FIGS. 13A and 13B, the cases of "Wy>C" and "Wy<−C" are shown, in which exposure commencement is not permissible. Exposure commencement is not permissible when the position of the blurring correction optical system 2 is in the outermost peripheral portion of the range of movement because a large margin of movement is required to avoid exceeding the range of movement of the blurring correction optical system 2 due to unexpected camera blurring movements. In FIGS. 14A and 14B, if S335 is satisfied and Wy>C holds, exposure will not be performed because the blurring correction optical system 2 is in the outermost portion of its range of motion.

Further, with respect to the processes shown in FIGS. 13A and 13B and 14A and 14B, the possibility exists that the photographer may change the mode setting dial 9 of the camera, combining the setting of each photographic mode or the condition of the shutter speed during photography.

Figure 7:
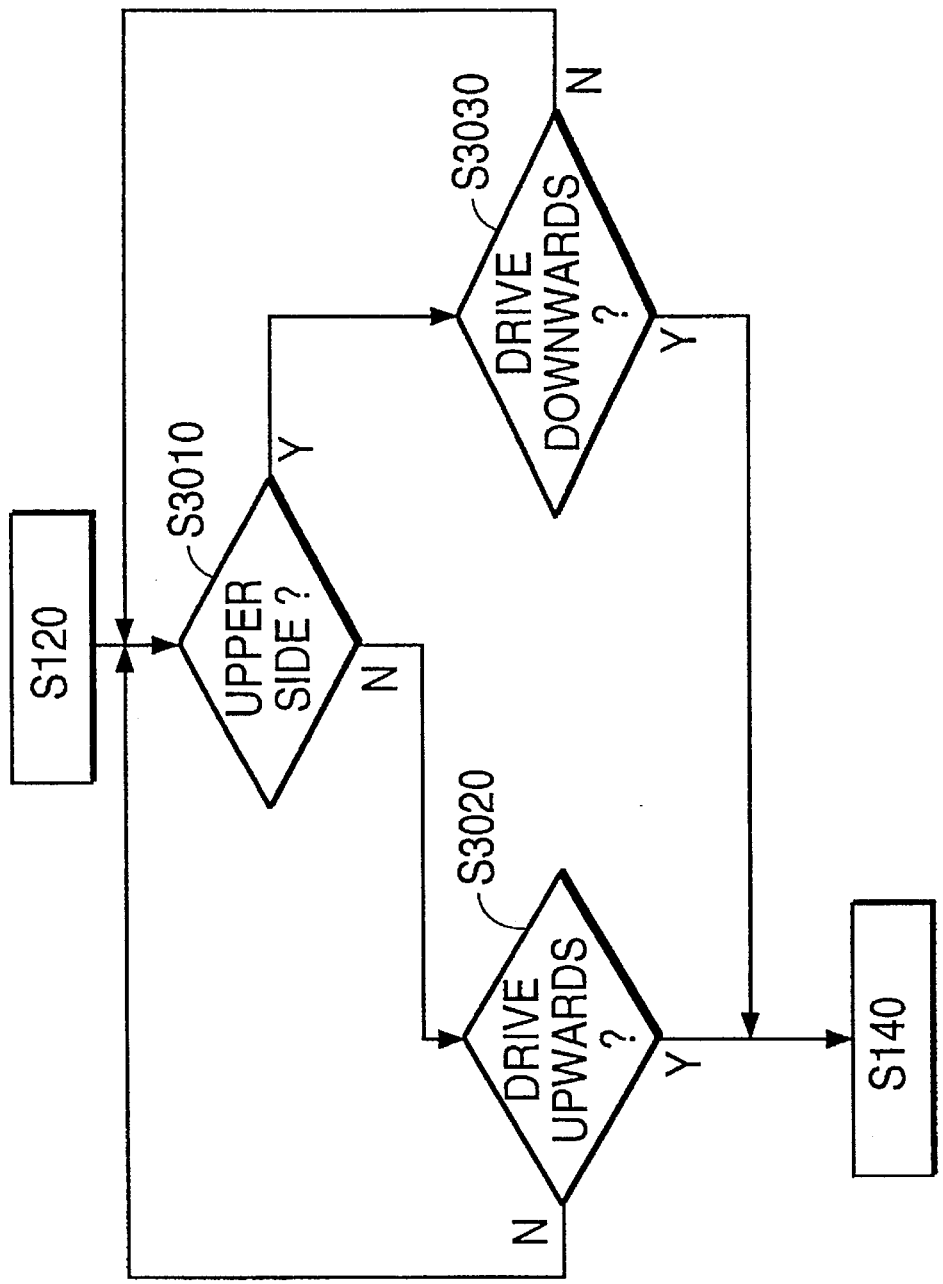
FIG. 7 is a flow chart showing an example of a sequence of operations performed in a camera having a blurring prevention function in accordance with a third embodiment of the present invention.
Figure 8:
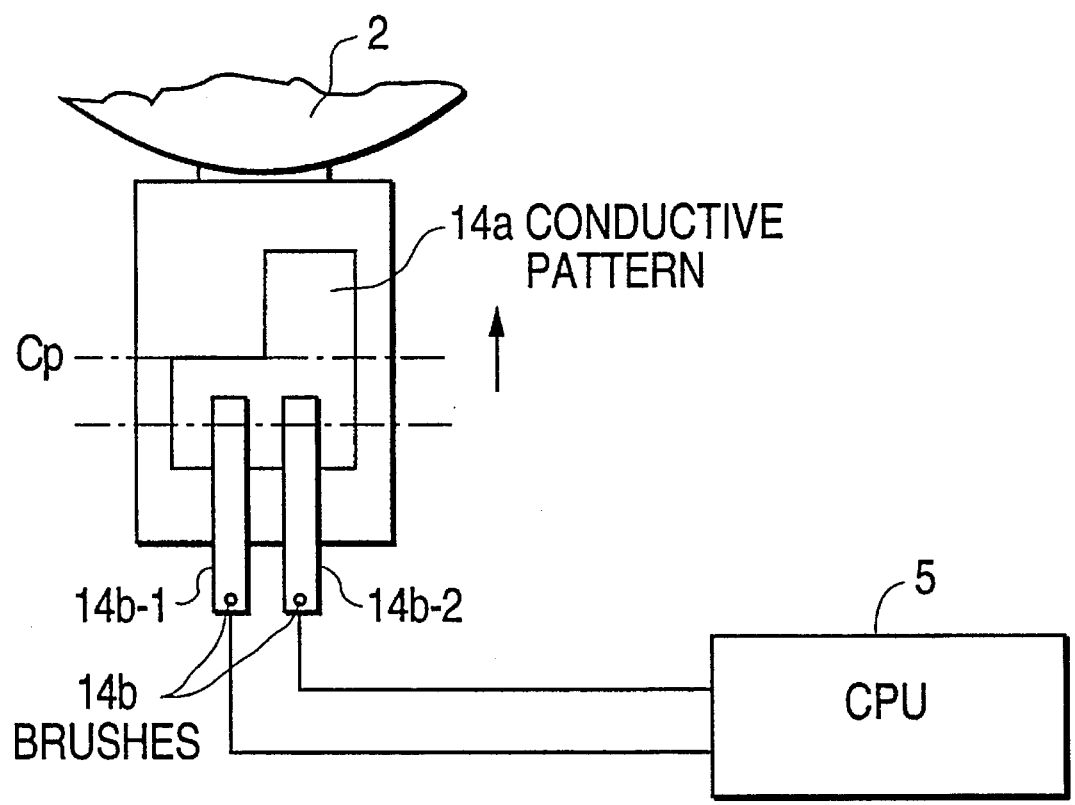
FIG. 8 is a schematic diagram of a correction optical system position sensor in accordance with the third embodiment of the present invention.

FIG. 7 is a flow chart showing an example of a control process in a camera in accordance with a third embodiment of the present invention. FIG. 7 shows a situation in which the drive position at the blurring correction optical system 2 can only be determined as to which side of the center point (Cp) the optical system 2 is located. FIG. 8 shows a correction optical system position sensor used in conjunction with the third embodiment of the invention. As shown in FIG. 8, the correction optical system position sensors 4y and 4x (FIG. 2) comprise conductive pattern 14a.

Referring to FIG. 7, for the sake of simplicity, only the sequence for determination in the Y-direction will be described. First, in S3010 it is determined whether the blurring correction optical system 2 is on the upper side of the center point. When the correction optical system position sensor 14a (FIG. 8) determines the correction optical system 2 is above the center point, there is conduction between the brushes 14b-1, 14b-2 of the position sensor 14a. If the blurring correction optical system is not above the center point there is no conduction, between the brushes 14b-1 and 14b-2.

In S3010, when the blurring correction optical system 2 is determined above the center point, control proceeds to S3030, and it is determined whether a drive control signal to the correction drive unit 3y is such to cause a downward direction of drive. The drive control signal is supplied by CPU 5 and is easily monitored.

In S3030, when it is determined that a downward direction drive signal is generated, since the blurring correction optical system 2 is driven toward the center point, S130 ends and the routine proceeds to S140. If the downward direction drive signal is not detected, control returns to S3010.

When the decision in S3010 is negative, control proceeds to S3020. The blurring correction optical system 2 is on the lower side of the center point. In S3020 it is determined whether the drive control signal to the correction drive unit 3y causes an upward direction of drive.

When it is determined in S3020 that an upward direction drive signal is generated, because the blurring correction optical system 2 is being driven toward the center point, S130 ends and the routine proceeds to S140. If an upward direction drive signal is not generated, control returns to S3010.

In each of the above-described embodiments of the present invention, the blurring correction optical system 2 has been described with respect to a system which shifts an imaging lens and corrects image blurring. However, the system is not limited to correcting image blurring and, for example, the blurring correction optical system 2 comprising a portion of the photographic optical system may also be used as a system which corrects image deflection by a shifting motion of this part of the optical system.

Figure 9:
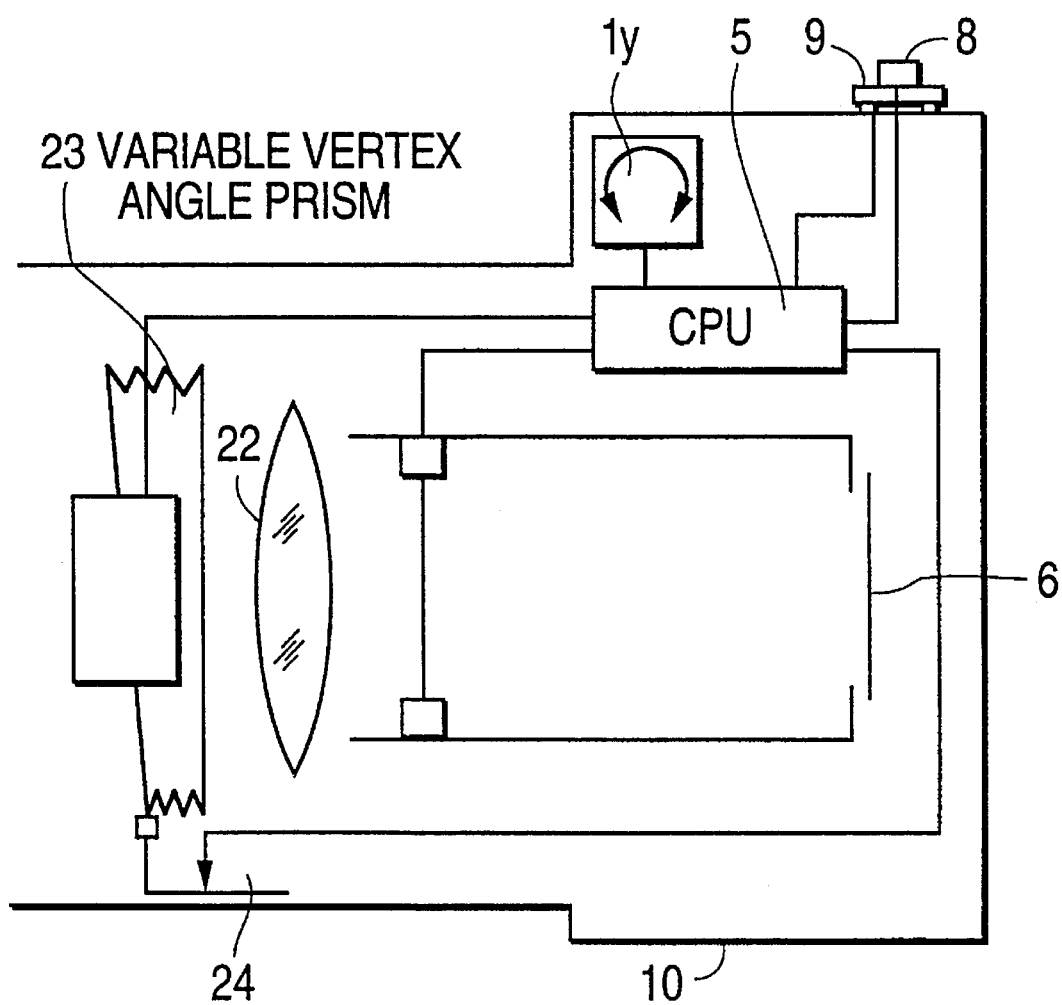
FIG. 9 is a side view of a camera having a blurring correction optical system with a blurring prevention function in accordance with the first embodiment of the present invention.

Moreover, as shown in FIG. 9, the correction optical system may be a variable vertex angle prism 23. As seen in FIG. 9, a photographing optical system 22 forms an image, and a variable vertex angle prism angle sensor 24 detects a surface angle of the variable vertex angle prism 23. In the case of the variable vertex angle prism 23, the center point of the respective drive angle of the pitch correction drive surface and yaw direction drive surface are equivalent to the center point which has been described herein above.

Further, the blurring correction optical system 2 may be a system which corrects image deflection by inserting a reflecting mirror within the photographic optical system. The blurring correction optical system 2 may also correct the positional vibration of an image imaged on the film 6, by causing the film 6 to move up and down, left and right.

Thus, in accordance with the embodiments of the present invention, by taking into account the drive position and drive speed of the blurring correction optical system 2, exposure is commenced under conditions in which it is expected that the movement range of the optical system 2 will not be exceeded. If the movement range is expected to be exceeded the commencement of an exposure is inhibited. A time lag between a release operation and exposure is shortened while prevention of image deflection is achieved.

The embodiments of the present invention, as described above, advantageously prevent image blurring by, after the release button has been depressed, commencing exposure when the drive direction of the blurring correction optical system is toward the center point of its drive range, thereby providing a margin of motion of the blurring correction optical system of at least half its range of motion in the direction in which driving is performed. The anti-vibration drive stroke during the exposure can be made large. Further, the release timing is not made large, and the effect obtained is that of photography having good image blurring prevention.

Moreover, in cases when a comparatively short exposure time is set automatically according to the conditions, the exposure action is immediately started.

Although preferred embodiments of the invention have been shown and described, it will be appreciated by those skilled in the art that changes may be made in these embodiments without departing from the principles and spirit of the invention, the scope of which is defined in the appended claims and their equivalents.

What is claimed is:

1. An image deflection prevention device suitable for a camera, comprising:

a blurring movement detection unit to detect an amount of movement of the camera;

an optical system including a photographic lens;

a blurring correction unit to drive the optical system and an imaging surface relative to each other to eliminate blurring of an image on the imaging surface;

a correction position detection unit to detect a position of the blurring correction unit;

a blurting movement control unit to determine an amount of correction of the blurring correction unit from the output of the blurring movement detection unit, and to drive the blurring correction unit according to the output of the correction position detection unit; and an exposure control unit to control exposure action and to inhibit commencement of exposure action when a drive direction of the blurring correction unit determined from an output of the correction position detection unit is away from a center point of a drive range of the blurting correction unit; and a release button, wherein the exposure control unit commences exposure a predetermined time after the release button has been depressed when a set exposure time is shorter than a predetermined exposure time irrespective of the drive direction of the blurring correction unit, and the predetermined time after the release button has been depressed is a value between ¼ the inverse of the focal length of the photographic lens and sixteen times the inverse of the focal length of the photographic lens.

2. An image deflection prevention device as recited in claim 1, wherein the blurring movement correction unit is a vertical direction drive unit.

3. An image deflection prevention device as recited in claim 1, further comprising an attitude sensor to detect an attitude of the camera, and wherein the blurring correction unit is a drive unit which drives in a direction of gravity.

4. An image deflection prevention device suitable for a camera, comprising:

a blurring movement detection unit to detect an amount of movement of the camera;

a blurring correction unit to perform a correction drive of one of an optical system and an imaging surface to prevent movement of the image on the imaging surface;

a correction position detection unit to detect a position of the blurring correction unit;

a position determination unit to determine whether the position of the blurting correction unit detected by the correction position detection unit is within a specified range within the drive range of the blurring correction unit;

a blurring movement control unit to determine an amount of correction of the blurring correction unit from the output of the blurring movement detection unit, and to drive the blurring correction unit according to the output of the correction position detection unit;

a direction determination unit to determine a drive direction of the blurring correction unit with respect to a center point of a range of motion of the blurring correction unit; and an exposure control unit to permit exposure commencement when the position determination by the position determination unit is outside the specified range and the determination of the direction determination unit is toward the center point.

5. An image deflection prevention device as recited in claim 4, wherein the drive range of the blurring correction unit is +1, and the specified range is a range of ±¼.

6. An image deflection prevention device suitable for a camera, comprising:

a blurring movement detection unit to detect an amount of movement of the camera;

a blurring correction unit to receive an output from the blurring movement detection unit and to perform a correction drive of one of an optical system and an imaging surface in a direction to eliminate blurring movement of an image on the imaging surface;

a correction position detection unit to detect a position of the blurring correction unit;

a position determination unit to determine whether the position of the blurring correction unit is a specified range within a drive range of the blurring correction unit;

a blurring movement control unit to determine an amount of correction of the blurring movement correction unit from the output of the blurring movement detection unit, and to drive the blurring movement correction unit according to the output of the correction position detection unit;

a direction determination unit to determine a drive direction of the blurring correction unit with respect to a center point of the drive range of the blurring correction unit; and an exposure control unit to inhibit exposure when the position determination by the position determination unit is outside the specified range, and the determination of the direction determination unit is outward from the center point.

7. An image deflection prevention device suitable for a camera, comprising:

a blurring movement detection unit to detect an amount of movement of the camera;

a blurring correction unit to receive an output from the blurring movement detection unit and to perform a correction drive of one of a photographic optical system and an imaging surface in a direction to eliminate blurring of an image on the imaging surface;

a correction position detection unit to detect a position of the blurring correction unit;

a position determination unit to determine whether the position of the blurring correction unit detected by the correction position detection unit is within a specified range within a drive range of the blurring movement correction unit;

a blurring movement control unit to determine an amount of correction of the blurring movement correction unit from the output of the blurring movement detection unit and to drive the blurring movement correction unit according to the output of the correction position detection unit;

a speed determination unit to determine a drive speed of the blurring correction unit relative to a predetermined value; and an exposure control unit to inhibit exposure when the position determination by the position determination unit is inside the specified range, and the speed determination by the speed determination unit is greater than the predetermined value.

8. An image deflection prevention device suitable for a camera, comprising:

a blurring movement detection unit to detect an amount of movement of the camera;

a blurring correction unit to receive an output from the blurring movement detection unit and to perform a correction drive of one of an optical system and an imaging surface in a direction to eliminate blurring movement of an image on the imaging surface;

a correction position detection unit to detect a position of the blurring movement correction unit;

a position determination unit to determine whether the position of the blurring movement correction unit is within a specified range within a drive range of the blurring correction unit;

a blurring movement control unit to determine an amount of correction of the blurring correction unit from the output of the blurring movement detection unit, and to drive the blurring correction unit according to the output of the correction position detection unit;

a speed determination unit to determine a drive speed of the blurring correction unit relative to a predetermined determination value; and an exposure control unit to permit exposure when the position determined by the position determination unit is within the specified range of motion and the speed determined by the speed determination unit is less than a predetermined value.

9. An image deflection prevention device as recited in claim 8, wherein the predetermined determination value is C, an upper limit of the drive range of the blurring correction unit is 1, and 1−C is a value corresponding to a time by which an exposure is separated from a release operation.

10. An image deflection prevention device suitable for a camera, comprising:

a blurring movement detection unit to detect an amount of movement of the camera;

a blurring correction unit to receive an output from the blurring movement detection unit and to perform a correction drive of one of an optical system and an imaging surface in a direction to eliminate blurring movement of an image on the imaging surface;

a correction position detection unit to detect the position of the blurring correction unit;

a position determination unit to determine whether a position of the blurring movement correction unit detected by the correction position detection unit is within a specified range of motion in the drive range of the blurring correction unit;

a blurring movement control unit to determine an amount of correction of the blurring movement correction unit from the output of the blurring movement detection unit, and to drive the blurring movement correction unit according to the output of the correction position detection unit;

a speed determination unit to determine a direction and a speed of the drive of the blurring correction unit, and an exposure control unit to compare the direction and speed of the drive of the blurring correction unit with predetermined values and to inhibit exposure when the position determination by the position determination unit is outside the specified range of motion, and the speed and direction determination by the speed determination unit is a higher outward speed than a predetermined outward speed.

11. An image deflection prevention device suitable for a camera, comprising:

a blurring movement detection unit to detect an amount of movement of the camera;

a blurring correction unit to receive an output from the blurring movement detection unit and to perform a correction drive of one of an optical system and an imaging surface in a direction to eliminate blurring movement of an image on the imaging surface;

a correction position detection unit to detect a position of the blurring movement correction unit;

a position determination unit to determine whether the position of the blurring movement correction unit detected by the correction position detection unit is within a specified range of motion in a drive range of the blurring movement correction unit;

a blurring movement control unit to determine an amount of correction of the blurring movement correction unit from the output of the blurring movement detection unit, and to drive the blurring movement correction unit according to the output of the correction position detection unit;

a speed determination unit to determine a direction and a speed of the drive of the blurring movement correction unit;

an exposure control unit to compare the direction and speed of the drive of the blurring correction unit with predetermined values and to permit exposure when the position determination by the position determination unit is outside the specified range, and the speed and direction determination by the speed determination unit is not a higher outward speed than a predetermined outward speed.

12. An image deflection prevention device suitable for a camera, comprising:

a blurring movement detection unit to detect an amount of blurring movement of the camera;

a blurring correction unit to receive an output from the blurring movement detection unit and to perform a correction drive of one of an optical system and an imaging surface in a direction to eliminate blurring movement of an image on the imaging surface;

correction position detection unit to detect a position of the blurring movement correction unit;

a blurring movement control unit to calculate an amount of correction of the blurring movement correction unit from the output of the blurring movement detection unit, and to drive the blurring movement correction unit according to the output of the correction position detection unit;

a correction speed detection unit to detect the direction and speed of the drive of the blurring movement correction unit by the blurring movement control unit;

a range exceeding prediction unit to predict, from position information detected by the correction position detection unit and speed information detected by the correction speed detection unit, exceeding of a drive range of the blurring movement correction unit during a photographic exposure; and an exposure control unit to inhibit exposure when the range exceeding prediction unit predicts exceeding of the drive range of the blurring movement correction unit during the photographic exposure.

13. A device for preventing image deflection in an optical system, comprising:

a correction optical system;

a movement detection device to detect movement of the optical system;

a correction optical system drive driving the correction optical system according to the detected movement, and having a predetermined range of motion;

a drive direction determination unit to determine a drive direction of the correction optical system relative to a center point of the range of motion of the correction optical system drive; and an exposure control unit controlling exposure according to the drive direction determined by the drive direction determination unit.

14. A device for preventing image deflection as recited in claim 13, wherein the exposure control unit inhibits exposure action when a direction determined by the drive direction determination unit indicates that the correction optical system is being driven away from a center point of a range of motion of the correction optical system, and does not inhibit exposure action when a direction determined by the drive direction determination unit indicates that the correction optical system is being driven toward a center point of a range of motion of the correction optical system.

15. A device for preventing image deflection in an optical system, comprising:

a correction optical system;

a movement detecting device detecting movement of the optical system;

a correction unit receiving an output from the movement detecting device and driving the correction optical system to correct for the movement of the optical system;

a direction detection unit detecting a direction of driving of the correction optical system with respect to a center point of a drive range of the correction optical system; and an exposure control unit to inhibit an exposure when the direction detection unit detects the direction of driving the correction optical system is away from the center point.

16. A method for preventing image deflection in an optical system, comprising:

detecting movement of the optical system;

moving a correction optical system to correct for the movement of the optical system;

determining a direction of movement of the correction optical system during correction movement; and controlling an exposure action according to the detected direction of movement of the correction optical system.

17. A method as recited in claim 16, wherein determining a direction of movement of the correction optical system comprises determining a direction of movement of the correction optical system with respect to a center point of a range motion of the correction optical system, and wherein controlling an exposure action comprises inhibiting exposure when the direction of movement is away from the center point of the range of motion of the correction optical system.

18. A method as recited in claim 16, further comprising the step of determining whether a position of the correction optical system is within a specified range within a range of motion of the correction optical system, and wherein controlling an exposure action comprises inhibiting exposure when the position of the correction optical system is outside the specified range and the direction of movement is away from a center point of the range of motion of the correction optical system.

19. A method as recited in claim 16, further comprising the step of determining a speed of the correction optical system during correction movement, and wherein controlling an exposure action comprises inhibiting an exposure action according to the determined speed and direction of the correction optical system.

20. A method for preventing image deflection as recited in claim 19, wherein controlling the exposure action comprises:

comparing the determined direction and speed of the correction optical system with predetermined values, and performing exposure when the determined direction of movement is toward a center point of a range of motion of the correction optical system, and the speed and direction comparison determined that the direction and speed of the correction optical system is a higher outward speed from the center point than a predetermined outward speed.

21. A method for preventing image deflection as recited in claim 19, wherein controlling exposure action comprises:

comparing the determined direction and speed of the correction optical system with predetermined values, and performing exposure when the comparison of the direction and speed determines that the direction and speed of the correction optical system is not a higher outward speed from the center point than a predetermined outward speed.

22. A device for preventing time lag between a release operation and exposure action in a camera having an image deflection prevention device, comprising:

a motion detection to detect camera motion;

a correction optical system;

a drive to drive the correction optical system within a predetermined range of motion according to the detected motion;

a position detection device to detect a position of the correction optical system;

a drive direction determination unit to determine a drive direction of the correction optical system based on a present position of the correction optical system and a previous position of the correction optical system; and an exposure control unit to inhibit exposure action when the drive direction of the correction optical system is away from a center point of the range of motion of the drive.

23. An image deflection prevention device suitable for a camera, comprising:

a blurring movement detection unit to detect an amount of movement of the camera;

an optical system including a photographic lens;

a blurring correction unit to drive the optical system and an imaging surface relative to each other to eliminate blurring of an image on the imaging surface;

a correction position detection unit to detect a position of the blurring correction unit;

a blurring movement control unit to determine an amount of correction of the blurring correction unit from the output of the blurring movement detection unit, and to drive the blurring correction unit according to the output of the correction position detection unit; and an exposure control unit to control exposure action and to inhibit commencement of exposure action when a drive direction of the blurring correction unit determined from an output of the correction position detection unit is away from a center point of a drive range of the blurring correction unit; and a release button, wherein the exposure control unit commences exposure a predetermined time after the release button has been depressed when a set exposure time is shorter than a predetermined exposure time irrespective of the drive direction of the blurring correction unit and the predetermined time after the release button has been depressed is four times the inverse of the focal length of the photographic lens.

24. An image deflection prevention device suitable for a camera, comprising:

a blurring movement detection unit to detect an amount of movement of the camera;

a blurring correction unit to drive an optical system and an imaging surface relative to each other to eliminate blurring of an image on the imaging surface;

a correction position detection unit to detect a position of the blurring correction unit;

a blurring movement control unit to determine an amount of correction of the blurring correction unit from the output of the blurring movement detection unit, and to drive the blurring correction unit according to the output of the correction position detection unit; and an exposure control unit to control exposure action and to inhibit commencement of exposure action when a drive direction of the blurring correction unit determined from an output of the correction position detection unit is away from a center point of a drive range of the blurring correction unit; and a mode setting unit to set an exposure mode and an automatic film wind-up mode, wherein the exposure control unit commences exposure according to the mode set by the mode setting unit at a predetermined time after the release button has been depressed irrespective of the drive direction of the blurring correction unit.

25. An image deflection prevention device as recited in claim 24, wherein the film windup mode includes a continuous mode, and when the continuous mode is set the exposure control unit immediately commences exposure after the release button has been depressed.

* * * * *